United States Patent [19]
Paitson

[11] 3,961,303
[45] June 1, 1976

[54] DEPTH CONTROLLERS WITH CONTROLLABLE NEGATIVE AND UNCONTROLLABLE POSITIVE LIFT-PRODUCING MEANS

[75] Inventor: John Lloyd Paitson, Houston, Tex.

[73] Assignee: Western Geophysical Company, Houston, Tex.

[22] Filed: May 8, 1974

[21] Appl. No.: 468,129

[52] U.S. Cl. .............................. 340/7 PC; 114/235 B
[51] Int. Cl.² ........................................... G01V 1/00
[58] Field of Search ............... 340/7 PC; 114/235 B; 43/42.03

[56] References Cited
UNITED STATES PATENTS

| | | | |
|---|---|---|---|
| 3,380,424 | 4/1968 | Bowker et al. | 114/235 B |
| 3,680,520 | 8/1972 | Smith | 340/7 PC |
| 3,839,985 | 10/1974 | Modert | 114/235 B |

Primary Examiner—Maynard R. Wilbur
Assistant Examiner—S. C. Buczinski
Attorney, Agent, or Firm—William A. Knox; Michael P. Breston

[57] ABSTRACT

A depth controller whose streamlined body has only negative variable lift-producing means, such as a pair of vanes that can produce a controllable downward force. Embodied in the controller are also means providing an uncontrollable upward force. The vanes are preferably movable by translation or rotation in a single plane, inclined relative to the horizontal. Depth control means are operatively coupled to retract the vanes inward as the controller moves from the water surface down to a reference depth. The uncontrollable positive lift producing means return the controller to the desired depth should it fall below the reference depth. Each controller can be used to effectively maintain a seismic streamer cable section at or near the desired reference depth.

10 Claims, 22 Drawing Figures

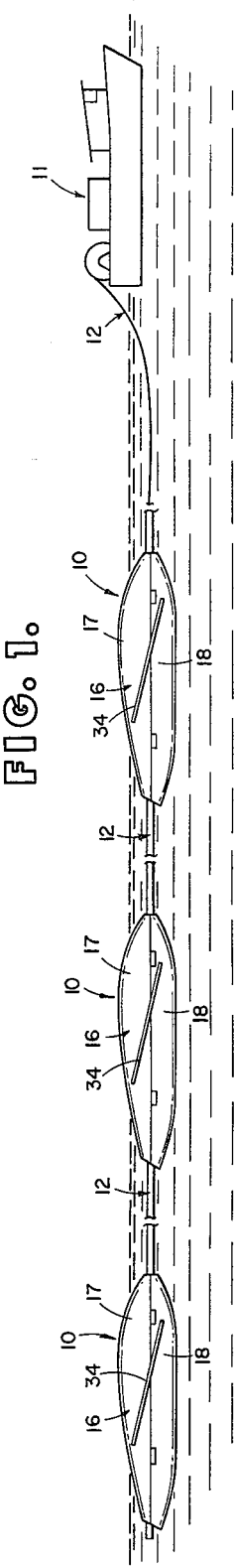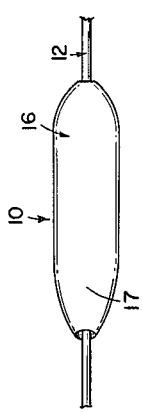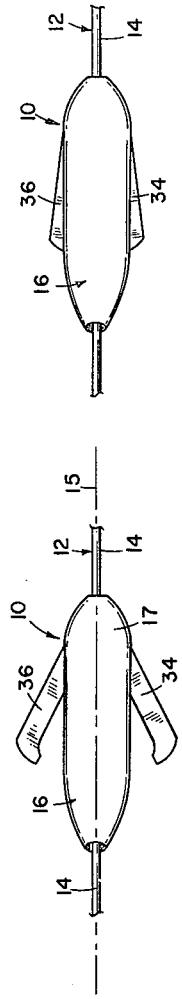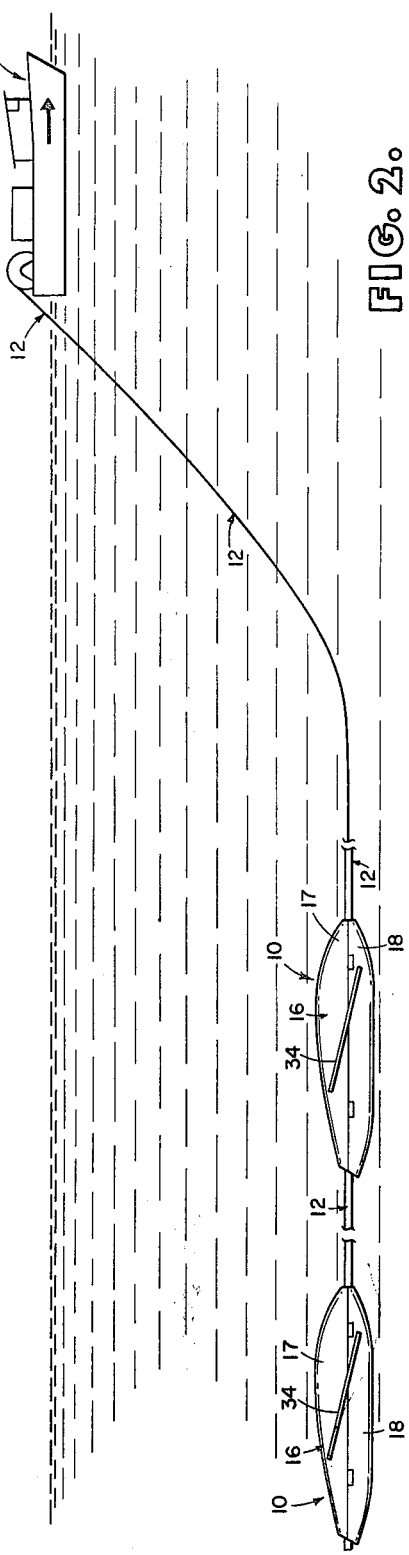

DEPTH CONTROLLERS WITH CONTROLLABLE NEGATIVE AND UNCONTROLLABLE POSITIVE LIFT-PRODUCING MEANS

BACKGROUND OF THE INVENTION

1. Field of the Invention

This invention relates to depth controllers which can be used in marine seismic prospecting for controlling the depth of seismic marine streamer cables.

2. Reference to Related Applications

This invention is related to the invention described in copending patent application Ser. No. 468,127 assigned to the same assignee.

3. Description of the Prior Art

In marine seismic surveying by the use of seismic streamer cables, it is the present practice to mount a plurality of spaced-apart depth controllers throughout the length of the cable to maintain it within a predetermined depth range. A commonly-used depth controller is described in U.S. Pat. No. 3,375,800. Other type controllers are described, for example, in U.S. Pat. Nos. 3,531,761 and 3,531,762.

The known depth controllers, especially those that are now in wide use, are characterized by a pair of vanes rotatable about a fixed horizontal axis perpendicular to the streamer cable. The vanes assume a particular climbing or diving angle, dependent on the instantaneous depth within the water of the seismic cable section to which the controller is attached. The vanes' rotation about the horizontal axis is controlled by a pressure-responsive device. When the cable's controller falls below a reference depth, its vanes rotate into a position to produce positive lift and the controller will lift the cable; on the other hand, when the cable climbs above the reference depth, the vanes rotate to produce negative lift and the controller will lower the cable. In this manner, the cable is automatically maintained within a prescribed depth range.

In any prior art controller with vanes rotating about a horizontal axis perpendicular to the controller's body, the chief drawback is that at any depth, especially at the cable's operating depth, the vanes remain completely outside of the controller's body. Fully exposed vanes generate turbulence and contribute appreciably to the undesired noise detected by the hydrophones within the streamer cable. Other known drawbacks are: the fully-exposed vanes have a tendency to snag debris, seaweed, etc. Such foreign matter may foul the vanes and interfere with their functioning, especially when the foreign matter becomes wedged between the vanes and the body. Often, the vanes become snagged on a reef or wreck, thereby completely and abruptly stopping the cable while under tow and causing the cable to become severed. Under such circumstances, a part or all of a very expensive streamer cable may be irretrievably lost. An additional, though relatively minor disadvantage of such prior are controllers is that their storage aboard ship requires excessive space, since their vanes cannot be retracted into the bodies of the controllers.

Other types of depth controllers are also known. Most, if not all, of such known controllers are characterized by controllable negative as well as controllable positive lift-producing means.

It is a main object of this invention to avoid the need for the controllable positive lift-producing means.

SUMMARY OF THE INVENTION

The present invention is adapted particularly to depth controllers, such as can be used for seismic streamer cables having variable, such as retractable and extendable, lift producing means. Depth-responsive means, typically responsive to water pressure, move the lift-producing means, such as vanes, inward and outward of the controllers' bodies. Such a depth controller can contain a single pair of symmetrically disposed vanes that have a fixed negative angle of attack. The negative lift is maximum at the water's surface, thereby tending to rapidly lower the controller as it moves forward in the body of water.

In accordance with this invention, at a reference depth, the negative lift decreases to a minimum value and is balanced out by a positive lift produced by the body itself.

The inward and outward movement of the vanes can be achieved by allowing the vanes to extend or retract by translation, i.e., all parts of the vanes move inwardly or outwardly together in parallel, or by rotation, i.e., the vanes are pivoted at one of their ends about axes substantially perpendicular to the planes of the vanes.

BRIEF DESCRIPTION OF THE DRAWINGS

FIG. 1 shows a seismic streamer cable towed by a seismic vessel and a plurality of longitudinally-displaced controllers of this invention mounted on the cable which is near the surface of a body of water, the vanes of the controllers being fully extended;

FIG. 2 is a view similar to FIG. 1 but with the cable and controllers at a desired predetermined depth;

FIGS. 1A, 2A, and 2B are top views of a presently preferred embodiment of the controller having rotatable vanes which are fully extended, fully retracted, and partially extended, respectively;

In the drawings, similar reference characters denote the same or similar parts throughout the several views. Although the invention is applicable to controlling the depth of any towed object, it will be illustrated herein only with reference to seismic streamer cables.

Figure 4:
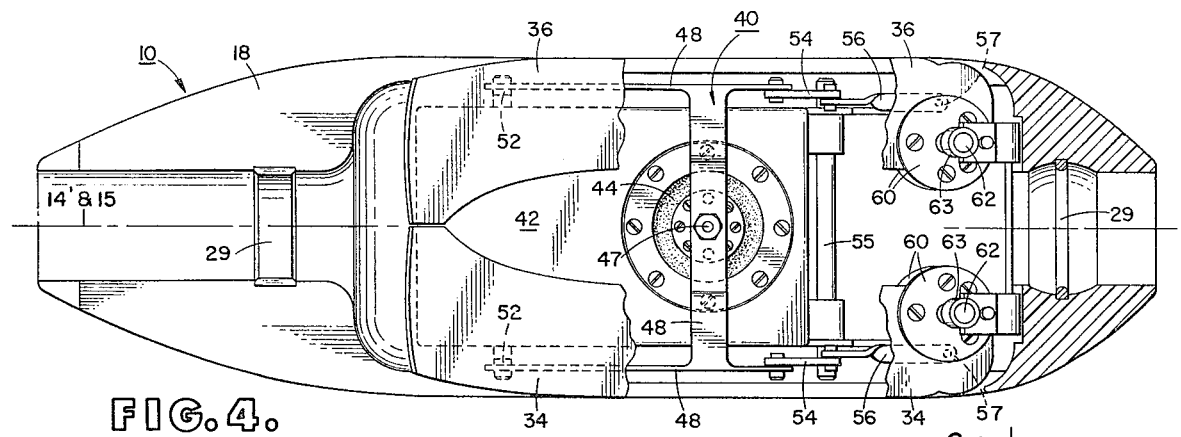
FIG. 4 is a partly sectional view taken on line 4—4 in FIG. 3 with the wings fully retracted and partially removed.

Referring now to the drawings and particularly to FIGS. 1, 2, 1A and 2A-B, a plurality of depth controllers, generally designated as 10, are rotatably mounted on a seismic streamer cable 12 which typically houses arrays of detectors (hydrophones) for receiving reflected seismic signals. Cable 12 is towed under tension by a seismic boat 11. A seismic streamer cable can be very long, say on the order of 2 miles.

Cable 12 is conventionally made of an outer flexible tubular jacket 14. Inside the jacket are arrays of hydrophones, tension cables, pressure gauges, and other instruments (not shown). The cable is filled with a suitable liquid.

Figure 8:
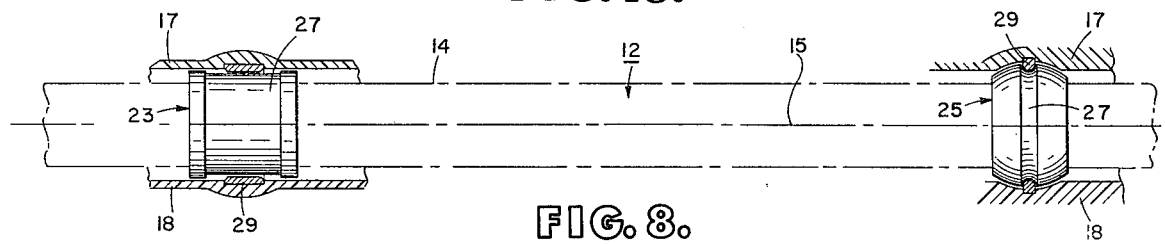
FIG. 8 illustrates the manner of rotatably mounting the body of the controller onto the streamer cable.

Each depth controller 10 (shown in FIGS. 1 and 2) has a streamlined body 16 comprising two half housings 17, 18. To allow cable 12 to rotate within body 16, there are provided two coupling means 23, 25 (FIG. 8) fixedly secured to and longitudinally-spaced apart on the outer jacket 14. Each coupling means may be made conveniently of two semi-cylindrical portions rigidly fastened to each other and to the outer surface of jacket 14. The outer cylindrical wall of each coupling is provided with a circumferential groove 27 which can have a substantially U-shaped or rectangular cross-section, each being adapted to loosely receive and rotatably support an annular yoke segment 29 made from two half-segments. Thus, free rotation between cable 10 and body 16 can take place about the cable's longitudinal axis 14', while linear movement therebetween is prevented by the engagement of yokes 29 within grooves 27.

Mounted for translational or rotational movement into or out of body 16 are negative lift-producing means comprising depth control elements such as a pair of vanes 34, 36.

Figure 3:
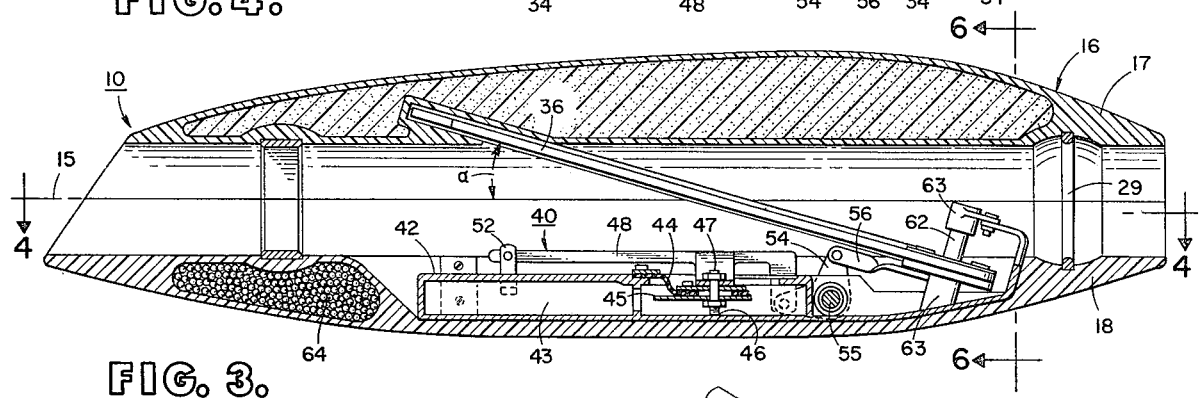
FIG. 3 is a vertical partly sectional view of the controller's body.

The vanes extend or retract in unison in response to a depth control signal that can be remotely applied from vessel 11, or internally produced by a force-generator 40. It can, for example, generate a force in response to a pressure variation from a predetermined pressure at a desired reference depth. The force-generator typically includes a pressure-to-force transducer 42 adapted to change a pressure variation into a linear translation, or into an angular rotation. The transducer has an air chamber 43 (FIG. 3) covered by a diaphragm 44, the external surface of which is exposed to ambient sea water pressure. Prior to use, chamber 43 is filled with air pressure through an air valve (not shown).

The maximum upward position of diaphragm 44 is determined by a stop shoulder 45 and minimum position by the end 46 of bolt 47 which is used to secure a flange of a pivot arm 48 to the diaphragm. The outer end of arm 48 is pivotally secured to a bracket 52, and its inner end is pivotally secured to the bottom end of an inverted L-shaped plate 54, as best shown in FIG. 4. Plate 54 is fixedly mounted on a lateral shaft 55. The upper end of plate 54 is pivotally secured to a linkage arm 56 whose outer end 57 is pivotally connected to one end of a vane 34 or 36. The vanes are sandwiched between a pair of circular plates 60. Each plate 60 is fixedly mounted on a shaft 62 rotatable in sleeve bearings 63.

Each of vanes 34 and 36 is similarly mounted and since the entire construction is symmetrical relative to a vertical plane passing through the longitudinal center axis 14' of the controller, no description of the symmetrical parts will be given.

The inner voids in the upper parts of the controller's body are filled with a light-weight plastic foam material to make the body 16 positively buoyant. The body can be balanced with the aid of lead shot 64 so that the center of buoyancy is above the axis 14' of the controller, and its center of mass is below the axis.

In operation, before each controller is coupled to a section of the seismic cable, the air pressure in chamber 43 is adjusted for the desired predetermined operating depth. When the controller is out of water, the outward force resulting from the air pressure in chamber 43 is greater than the inward force exerted by the atmospheric pressure, causing plate 54 to rotate maximally clock-wise, as viewed in FIG. 3.

The rotation of plate 54 is translated into maximum angular rotation of vanes 34, 36 which move throughout their entire range in a single plane P—P (FIG. 7) which is inclined by an acute angle $\alpha$ relative to the horizontal. The vanes always move in a descending attitude, i.e., they are always inclined forwardly and downwardly (negative angle of attack) in respect to the longitudinal axis 14'. As soon as each depth controller enters the water, a hydrodynamic force becomes developed on each of the vanes as a result of the forward velocity of the cable. The constant negative angle of attack of vanes 34, 36 preferably should not exceed 15°.

Figure 5:
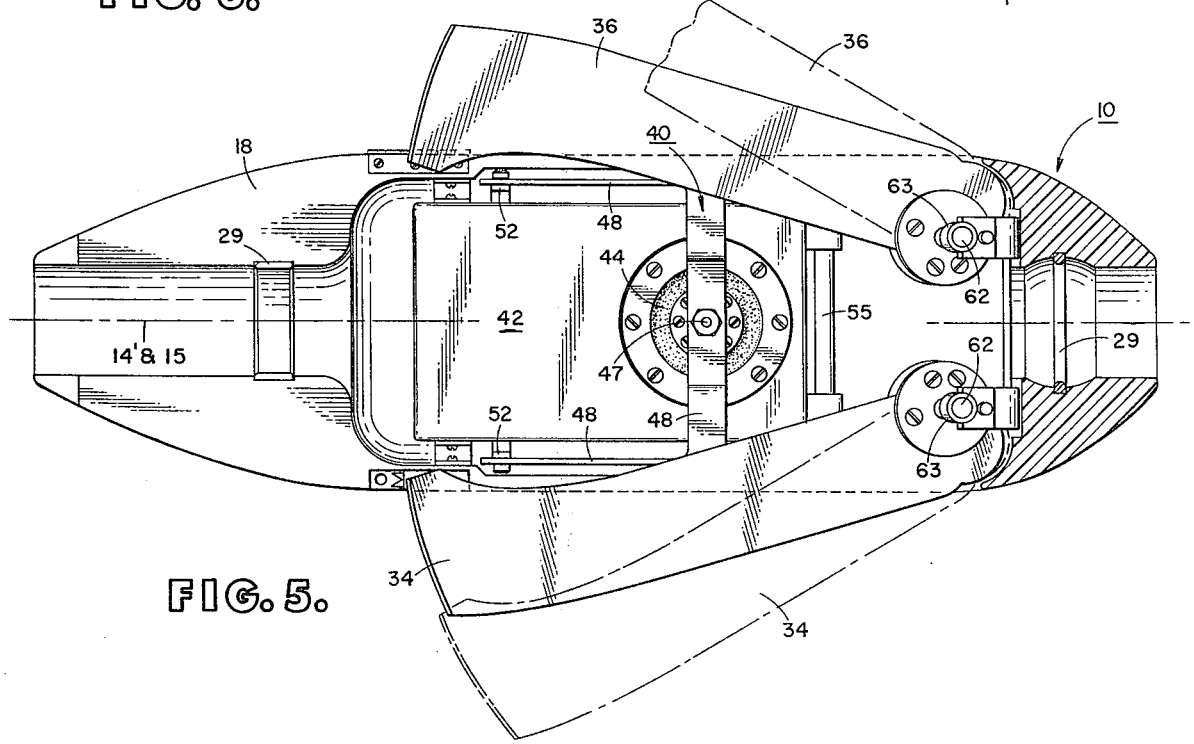
FIG. 5 is a view similar to FIG. 4 showing the wings as being partially extended (solid lines) and fully extended (broken lines)
Figure 6:
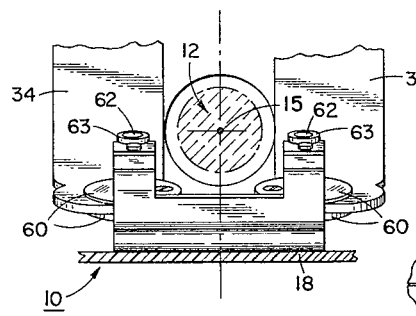
FIG. 6 is a sectional view on line 6—6 in FIG. 3.
Figure 13:
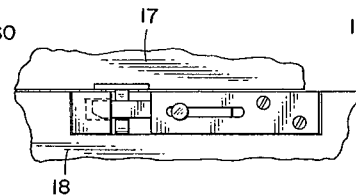
FIG. 13 is a front view of the latch used in FIG. 12.

The instantaneous total pressure or force exerted on each vane will vary with the effective external area of the vane exposed to the water and hence with the angular rotation of the vane. This force remains substantially normal to the plane of the vane. The vertical component of this force provides a controllable variable negative lift to the seismic cable's section and its controller. This negative lift causes the depth controller to dive until it reaches the desired predetermined depth whereat the air pressure in chamber 43 becomes balanced out by the ambient water pressure. When that happens, diaphragm 44 assumes its neutral or rest position, and vanes 34, 36 then assume a partially extended position, preferably ⅓ or less in area of their full extension, as shown in solid lines in FIG. 5 (the dotted lines show the fully extended position).

Any controller is normally designed to be slightly less dense than the water in which it will operate, i.e., it is buoyant and therefore will exert a continuous static positive lift. Accordingly, should the tow of the seismic streamer cable come to a stop the controller will climb to the water surface.

In accordance with this invention, the body itself of the controller is designed such that it will provide also a continuous dynamic positive lift under tow. At the desired predetermined depth, this positive dynamic lift produced by the body of the controller is such that with the vanes only partially extended (⅓ or less), the negative lift produced by the vanes substantially equals the body's dynamic positive lift, hence the net lift on the seismic cable is substantially zero.

Figure 7:
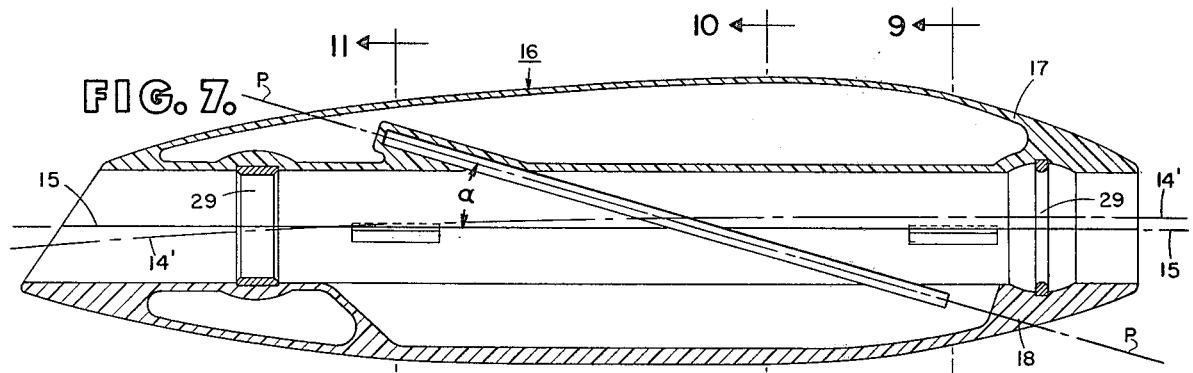
FIG. 7 is similar to FIG. 3 but without the depth controller mechanism.
Figures 9, 10, 11:
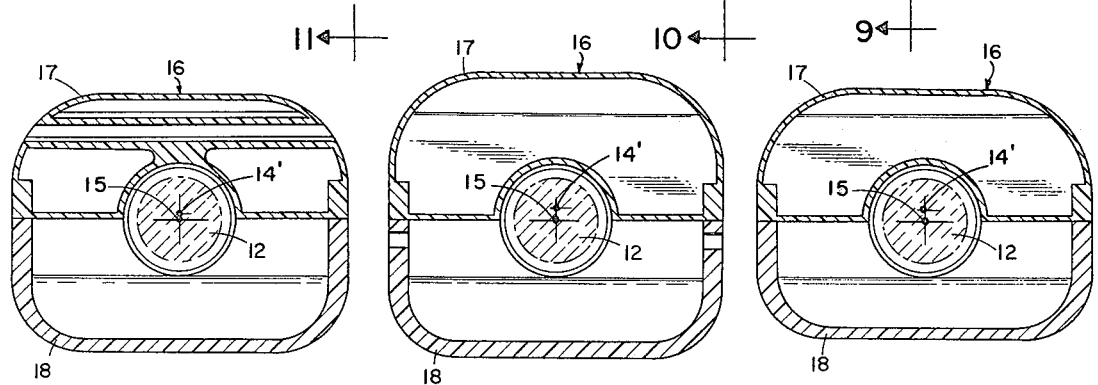
FIGS. 9-11 are vertical sectional views on lines 9—9, 10—10 and 11—11 in FIG. 7.
Figure 15:
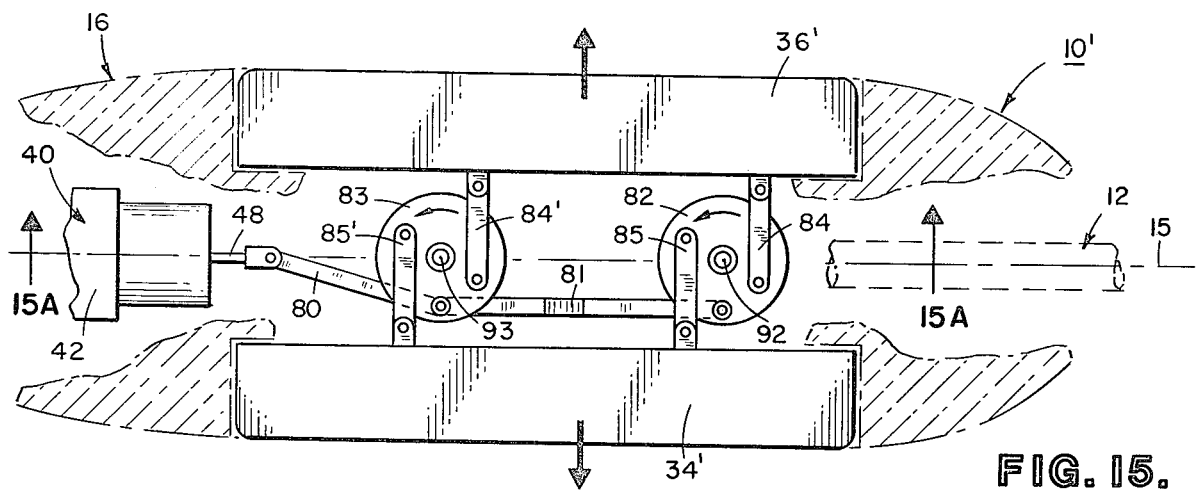
FIG. 15 is a partly sectional view on line 15—15 in FIG. 14.
Figure 15A:
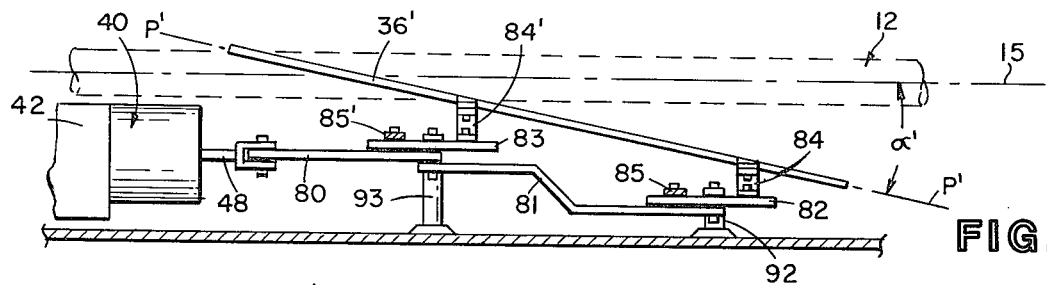
FIG. 15A is a view on line 15A—15A in FIG. 16 showing the depth control mechanism for extending and retracting the vanes in the embodiment of FIG. 14.
Figure 14:
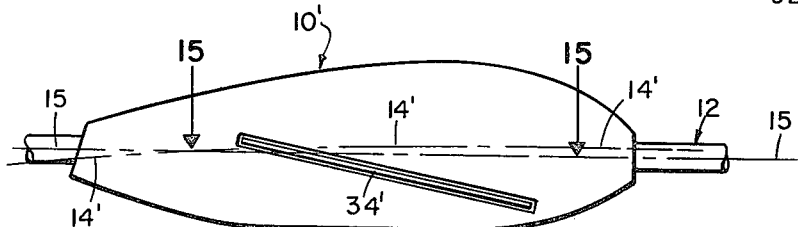
FIG. 14 is a side view in elevation of another embodiment of the controller of this invention having vanes mounted for translational movement.
Figure 18:
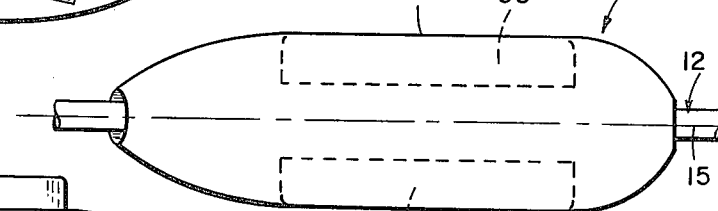
FIGS. 16-18 are top views of the depth controller of FIG. 14 showing different vane positions.
Figure 16:
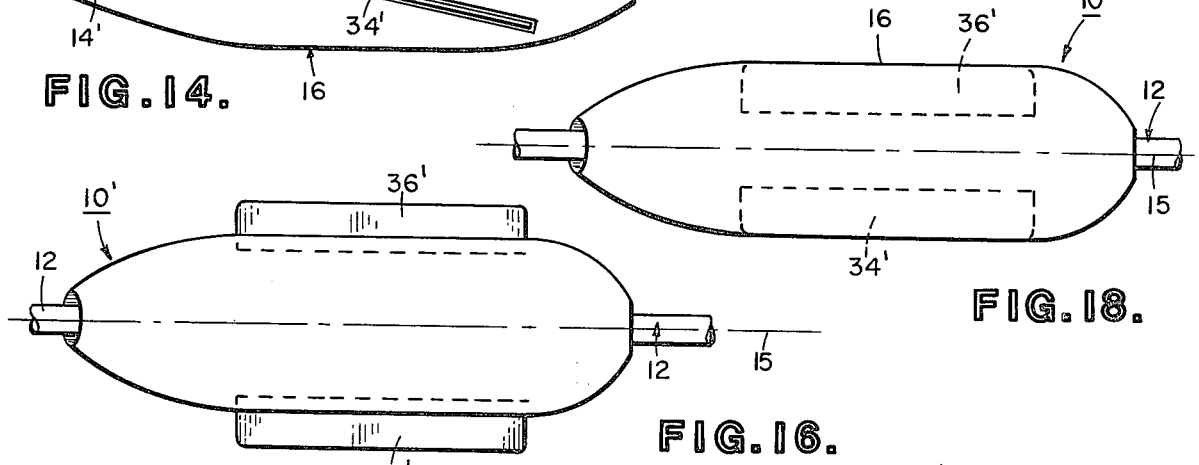
Figure 17:
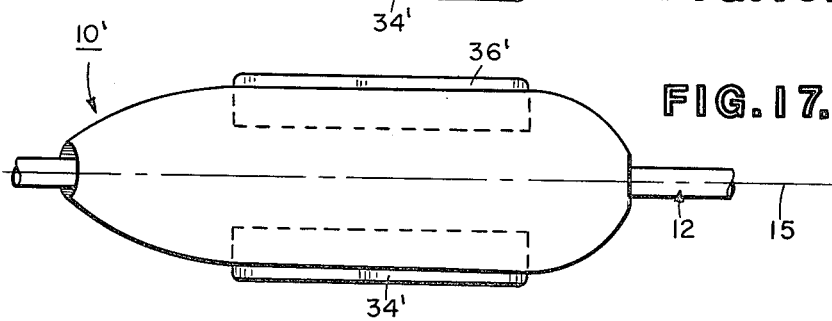

The desired positive dynamic lift need not be controllable. It can be constant with depth. It will, of course, be variable with the velocity of tow. This dynamic positive lift is obtained from the controller's body by making its longitudinal axis 14' arcuate so that its trailing end slopes downwardly relative to the longitudinal axis 15 of the seismic cable, as best shown in FIG. 7.

Should the seismic cable fall below the desired predetermined depth, the vanes will fully retract into the body (FIG. 2A), the positive dynamic lift produced by the controller and exerted on the cable will then restore the cable back to the desired predetermined depth. Should cable 10 rise above the predetermined depth, the vanes will move outwardly to thereby exert a negative lift sufficient to restore the cable back to its predetermined depth.

Referring now to the embodiment of the controller 10' shown in FIGS. 14–18, it is again provided with a pair of vanes 34', 36'. Vanes 34', 36' move throughout their entire range in a single plane P'—P' which is inclined by an acute angle α relative to the horizontal. These vanes always move in a descending attitude, i.e., they are always inclined forwardly and downwardly (negative angle of attack) in respect to the controller's longitudinal axis 14'. The constant negative angle of attack of vanes 34', 36' preferably should not exceed 15°.

The vanes extend or retract in unison in response to a depth control signal that can be remotely applied from vessel 11, or internally produced by a force-generator 40 such as pressure transducer 42 having an output shaft 48. Pivotally coupled to shaft 48 is a linkage arm 80 which in turn is pivotally secured to another linkage arm 81. By a mechanism comprised of wheels 82, 83 to which are pivotally secured linkage arms 84, 85, and 84', 85', the linear motions of shaft 48 are transformed into lateral extensions or contractions of the vanes 34', 36'. Wheels 82, 83 rotate on shafts 92, 93, respectively. All points of each vane move by the same amount and in the same direction relative to a vertical plane of symmetry.

Figure 12:
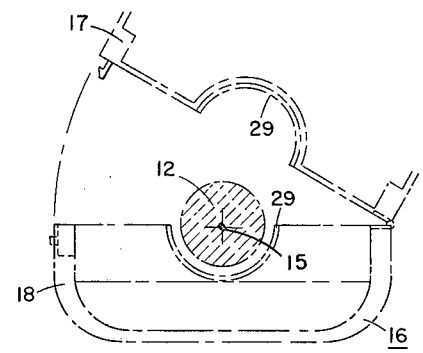
FIG. 12 illustrates the manner of coupling the two semi-housings of the controller onto the streamer cable.

The operation of controller 10' shown in FIG. 12 is in all respects similar to the operation of the previously described embodiment 10, except that in embodiment 10', the extensions and contractions of the vanes is achieved by translation instead of by rotation. It will also be noted that the longitudinal axis 14' of controller 10' is also arcuate.

While this invention has been described with reference to specific embodiments thereof, it will be apparent to those skilled in the art that various modifications may be made therein without departing from the scope of the claims attached hereto.

What is claimed is:

1. A depth controller for controlling the depth at which an object coupled to the controller is towed in a body of water, said controller comprising:
  a streamlined body;
  depth control elements movably mounted in said body to produce only negative lift; and
  depth control means including means operatively coupled to said elements to extend and retract them from and into said body in dependence upon the depth of the controller in said water.

2. A depth controller for controlling the depth at which a section of a seismic streamer cable is towed in a body of water, said controller comprising:
  a streamlined body;
  a single pair of movable vanes in said body, each vane having a fixed negative acute angle of attack throughout its entire range of movement; and
  depth control means operatively coupled to said vanes to control the movement of said vanes from and into said body.

3. The depth controller of claim 2, wherein said movement is a linear movement of translation.

4. The depth controller of claim 2, wherein said movement is a movement of rotation with respect to an axis substantially perpendicular to each vane.

5. A depth controller for controlling the depth at which the controller moves in a body of water, said controller comprising:
  a hollow streamlined body having two half housings adapted to become coupled to a towed object;
  said controller having only negative lift producing means movably mounted in said body;
  said body producing a positive dynamic lift when the controller is under tow, said positive lift being substantially constant with depth variations;
  force producing means operatively coupled to move said lift-producing means in dependence upon the depth of the controller in said water; and
  said lift-producing means changing the amount of area exposed to the water, thereby exerting a controllable negative lift on said body.

6. The depth controller of claim 5, wherein said negative lift-producing means comprise a pair of movable vanes in said body, each vane having a fixed negative acute angle of attack throughout its entire range of movement.

7. The depth controller of claim 6 wherein said pair of vanes is symmetrically mounted relative to a vertical plane passing through the controller's longitudinal axis.

8. The depth controller of claim 6 wherein,
  said vanes are moved by a single force producing means, including a pressure transducer having an output shaft movable with changes in ambient water pressure; and
  means pivotally coupling said vanes to said shaft.

9. The depth controller of claim 5 wherein the longitudinal axis of said body is arcuate and sloping downwardly when said controller is in the water.

10. A depth controller for controlling the depth at which an object coupled to the controller is towed in a body of water, said controller comprising:
  a streamlined body having a shape adapted to produce lift in one vertical direction;
  depth control elements movably mounted in said body to produce lift in an opposite vertical direction; and
  depth control means including means operatively coupled to said elements to extend and retract them from and into said body in dependence upon the depth of the controller in said water.

* * * * *